(12) United States Patent
Logiudice (10) Patent No.: US 6,848,592 B2
(45) Date of Patent: Feb. 1, 2005

(54) COOKWARE DEVICE AND COVER

(75) Inventor: Paul Angelo Logiudice, Toledo, OH (US)

(73) Assignee: Calphalon Corporation, Freeport, IL (US)

( * ) Notice: Subject to any disclaimer, the term of this patent is extended or adjusted under 35 U.S.C. 154(b) by 0 days.

(21) Appl. No.: 10/259,852

(22) Filed: Sep. 30, 2002

(65) Prior Publication Data

US 2004/0060936 A1 Apr. 1, 2004

(51) Int. Cl.[7] .................................................. A47J 36/06
(52) U.S. Cl. ..................... 220/377; 220/912; 126/384.1; 99/403
(58) Field of Search ........................... 99/403; 220/377, 220/377.1, 213, 200, 254.1, 212.5, 912; 126/389.1, 384.1, 383.1

(56) References Cited

U.S. PATENT DOCUMENTS

| | | | | |
|---|---|---|---|---|
| 1,248,274 A | * | 11/1917 | Crim ...................... | 126/389.1 |
| 1,676,146 A | * | 7/1928 | Kraft ...................... | 126/384.1 |
| 3,598,105 A | * | 8/1971 | Cristaldi .................. | 126/21 R |
| 3,687,331 A | * | 8/1972 | Racz ....................... | 220/215 |
| 6,105,810 A | * | 8/2000 | Daenen et al. ........... | 220/336.1 |

OTHER PUBLICATIONS

Catalogue page depicting a Frypan, Item No. 2000–011, 1pp.
Web page depicting a Pot set; Demeyere Sirocco; Aug. 29, 2003, 2pp.
Web page, *Professional Cutlery Direct Store*, Stockpot with lid, 1 pp.
Web page, *Professional Cutlery Direct Store*, Saucepan with lid, 1pp.

\* cited by examiner

*Primary Examiner*—Jacob K. Ackun, Jr.
(74) *Attorney, Agent, or Firm*—Foley & Lardner LLP

(57) ABSTRACT

A cookware device includes a cooking vessel and a cover. The cover includes a transparent concave portion positioned centrally on the cover. The concave portion has exterior and interior surfaces curved downwardly toward the cooking vessel. The exterior surface of the cover surrounding the concave-portion is concentric with the concave portion and rises upwardly from an outer edge of the cover to integrally connect with the concave portion. When the cover is installed on a cooking apparatus condensed moisture will run along an interior surface of the cover to a base of the concave portion and drop into the cooking vessel to clear the cover and provide improved viewing of food contained in the vessel.

5 Claims, 9 Drawing Sheets

COOKWARE DEVICE AND COVER

BACKGROUND

The present invention relates to cookware, and more specifically to covered cookware such as, for example, pots, pans and casseroles.

Cookware includes various general categories including, as mentioned above, pots, pans and casserole dishes. Pots typically include relatively deep vessels or containers, while pans are relatively shallow. Casserole dishes may be have a wide variety of depths. Cookware may also include a cover to enclose the vessel.

The typical cover is designed to form a seal between the cover and the underlying vessel. Once the seal is formed, the heat supplied to the vessel may be reduced to save energy, while proper cooking continues due to the internal pressure in the vessel.

During cooking, moisture typically condenses on the interior of the cookware cover. In the case of covers formed of transparent material, such as glass, the condensation typically blocks or impairs the users view of the food items retained in the cooking vessel.

Many covers include handles used to facilitate the user lifting and replacing the cover. Typical handles are located close to the cover thereby creating an opportunity for the user's hand to contact a hot cover when grasping the handle, and exposing the user to the risk of a burn.

SUMMARY

Accordingly, an object of the present invention is to provide a cookware device and cover with a structure and arrangement that improves upon the conventional designs mentioned above.

According to an embodiment of the present invention, a cover for a cooking vessel is provided. The cover includes a transparent recessed portion. The cover is configured so that when the cover is installed on a cooking apparatus condensed moisture will run along an interior surface of the cover to the lowermost part of the recessed portion and drop into the cooking vessel to thereby clear the transparent recessed portion and provide improved viewing of food contained in the vessel.

According to one embodiment of the invention, the recessed portion may be centrally located and may be surrounded by a metallic portion. According to another embodiment, the cover may include a handle. The handle may be positioned to span the recessed portion so that when the handle is gripped the likelihood of contact with the cover is reduced.

According to another embodiment of the invention a cover for a cooking vessel is provided. The cover includes a transparent concave portion. The cover is configured so that when the cover is installed on a cooking vessel inner and outer surfaces of the concave portion are curved downwardly toward the cooking vessel thereby allowing condensed moisture to run along the inner surface of the concave portion to a base of the concave portion and to drop from the base into the cooking vessel to thereby baste food contained in the vessel.

The cover may include a handle located on an outer surface of the cover and positioned to span the concave portion so that when the handle is gripped the likelihood of contact with the cover is reduced. A portion of the cover surrounding the concave portion may be metallic and may be positioned concentrically with the concave portion and configured to rise upwardly from an outer edge of the cover to the concave portion.

According to yet another embodiment of the present invention, a cookware device is provided. The device includes a cooking vessel and a cover for the cooking vessel. The cover includes a transparent concave portion positioned centrally on the cover. The concave portion has exterior and interior surfaces curved downwardly toward the cooking vessel. The portion of the cover surrounding the concave portion is metallic and concentrically aligned with the concave portion; and the cover may be configured so that when the cover is installed on a cooking apparatus condensed moisture will run along an interior surface of the cover to a base of the concave portion and drop from the base into the cooking vessel to thereby clear the transparent cover and provide improved viewing of food contained in the vessel.

According to another aspect of the invention the cooking device may include a handle connected to the exterior surface of the cover surrounding the concave portion and positioned to span the concave portion so that when the handle is gripped the likelihood of contact with the cover is reduced.

It is to be understood that both the foregoing general description and the following detailed description are exemplary and explanatory only, and are not restrictive of the invention as claimed.

These and other features, aspects and advantages of the present invention will become apparent from the following description, appended claims, and the accompanying exemplary embodiments shown in the drawings, which are briefly described below.

DETAILED DESCRIPTION

Embodiments of the present invention are described further below with reference to the drawings.

Figure 1:
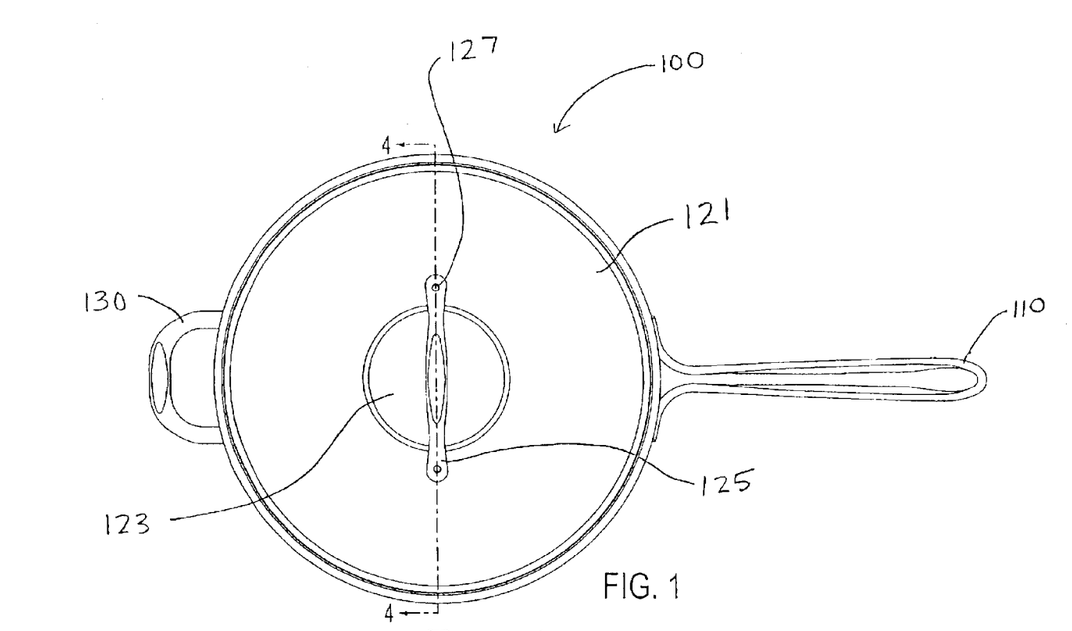
FIG. 1 is a top plan view of an item of cookware according to an embodiment of the present invention.
Figure 2:
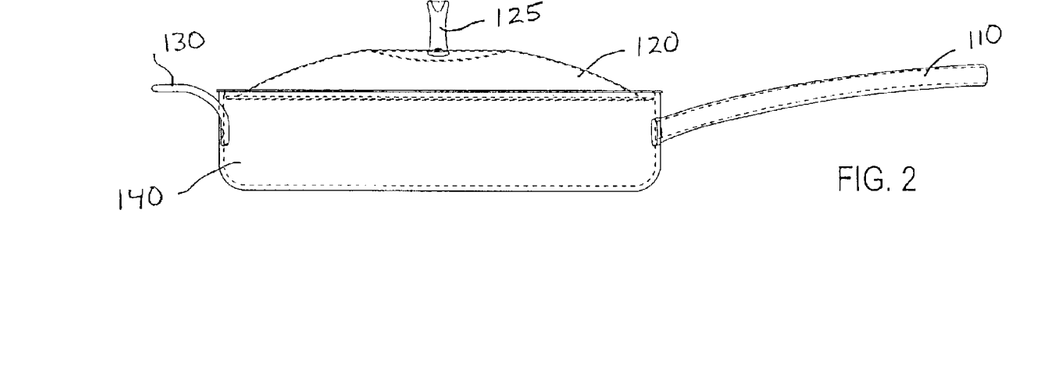
FIG. 2 is a side view of the item of cookware of FIG. 1.

An item of cookware 100 according to an embodiment of the present invention is shown in FIG. 1. The cookware 100 includes a long handle 110 a short handle 130 and a cover 120. As shown in FIG. 2, the cookware 100 includes a cooking vessel 140 for receiving items of food to be cooked.

Figure 3A:
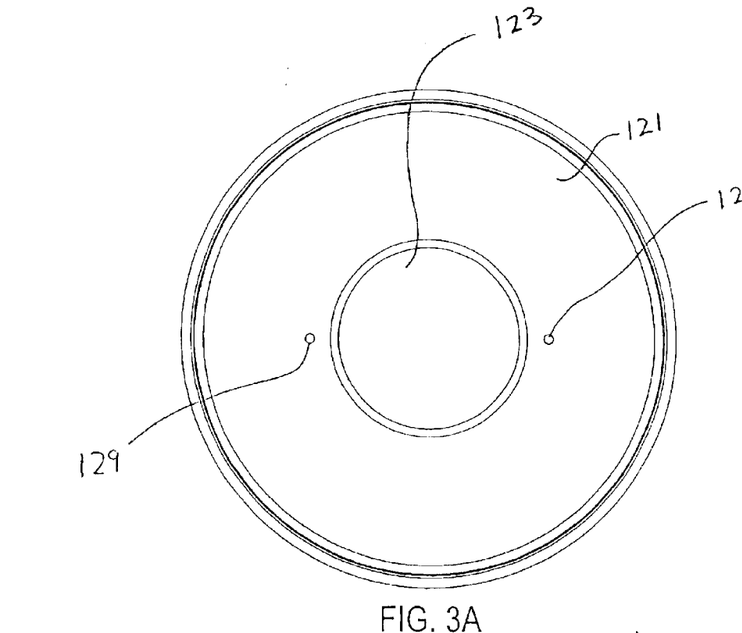
FIG. 3A is a top plan view of a cookware cover according to an embodiment of the present invention.
Figure 3B:
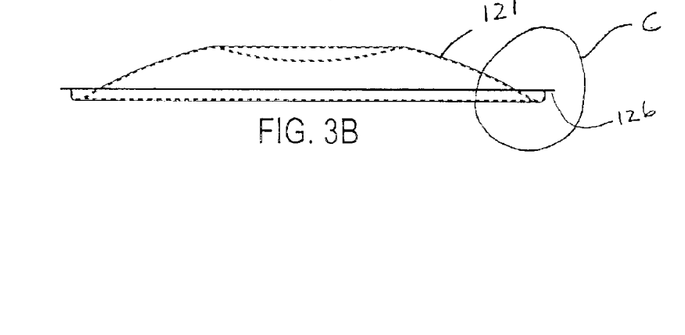
FIG. 3B is a side view of the cookware cover of FIG. 3A.
Figure 3C:
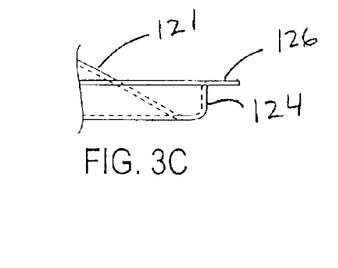
FIG. 3C is an enlarged side view of the portion of FIG. 3B surrounded by circle C.
Figure 4:
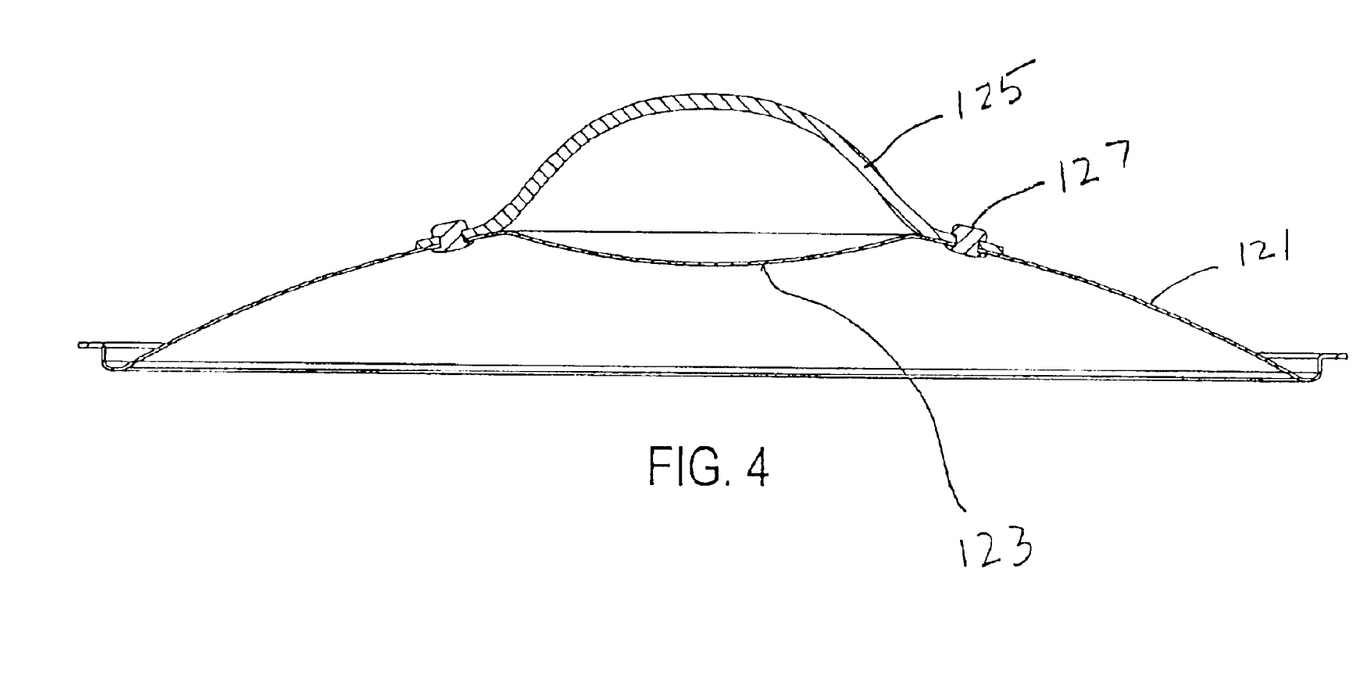
FIG. 4 is a cross sectional view of the cookware cover of FIG. 1 taken along the line 4—4.

The cookware cover 120 includes a recessed portion 123. A cover handle 125 preferably spans the recessed portion and is connected to the surrounding portion 121 by a pair of fasteners 127. According to an exemplary embodiment of the invention shown in FIG. 2, the recessed portion of the cover is concave. The surrounding portion 121 may be dome shaped and rises upwardly from the cooking vessel 140. Exterior and interior surfaces of the concave portion 123 curve downwardly towards the cooking vessel 140. As shown in FIG. 3A, the dome shaped portion 121 may include a pair of holes 129 for receiving the fasteners to connect the cover handle 125 to the cover 120.

As mentioned above and shown in FIGS. 1-4, the portion of the cover 120 surrounding the concave portion 123 may be dome shaped. However, the scope of the present invention includes a variety of configurations. For example, the surrounding portion may be flat, cone shaped, pyramidal, stepped, angled, etc. Also, while the cover 120 shown in the drawings has a generally circular perimeter, the scope of the present invention includes a variety of covers shaped to match the vessel being covered. For example, square, rectangular or oval shaped covers may be employed.

Furthermore, the recessed portion 123 is preferably concave. However, the scope of the present invention includes a variety of configurations including, for example, an inverted pyramid or cone, or a v-shaped trench. Furthermore, while the handle preferably spans the recessed portion the present invention includes alternative embodiments in which the handle is attached to the cover at other convenient locations. Including, for example, providing a long handle (e.g., the handle 110 attached to the cooking vessel) attached to the cover.

The cover 120 includes an outer rim. The outer rim has a lip 126 for resting on the top rim of the cooking vessel 140. When the cover is installed on the cooking vessel 140 the surrounding portion 121 of the cover descends downwardly below the top rim of the cooking vessel and curves upward to the lip 126. The cover includes a generally vertical section 124 that contacts the inner surface of the cooking vessel to thereby provide a snug fit between the cover and the vessel.

As shown in FIG. 2, the two portion of the cover are preferably concentric and, as shown in FIG. 2, integrally formed. The cover 120 is preferably formed of metallic material such as stainless steel. The cover handle 125 attaches to the dome shape portion 121 by fasteners 127. The cover handle is positioned to span the concave portion 123. The provision of the concave portion 123 allows a user to grasp the handle 125 with a reduced risk of contact with the cover 120. The concave portion 123 provides additional clearance for a users hand as it wraps around the handle 125.

The handle shown in the figures is just one exemplary embodiment of the cover handle. The scope of the present invention includes other suitable handle designs that are configured to span the downwardly curved portion of the cover.

The concave portion 123 also provides for automatic basting of food elements contained in the cooking vessel 140. When the cooking vessel is subjected to heat, temperature rises inside the vessel and steam is typically produced. As the steam rises it contacts the cover 120 and condenses on the surface thereof. Due to the provision of the concave portion 123 the condensed moisture particles will run down the concave surface 123. The particles or droplets typically collect at the bottom of the concave portion 123 and fall back on the food element contained in the vessel 140. Thus, automatic basting of the food elements is provided.

Figure 10A:
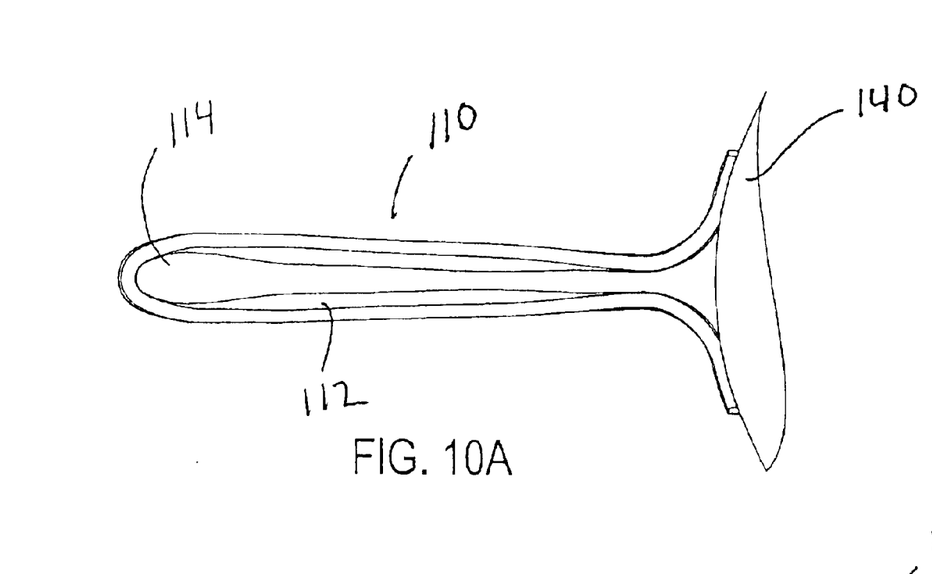
FIG. 10A is a top plan view of the long handle for the cookware item of FIG. 1.
Figure 10B:
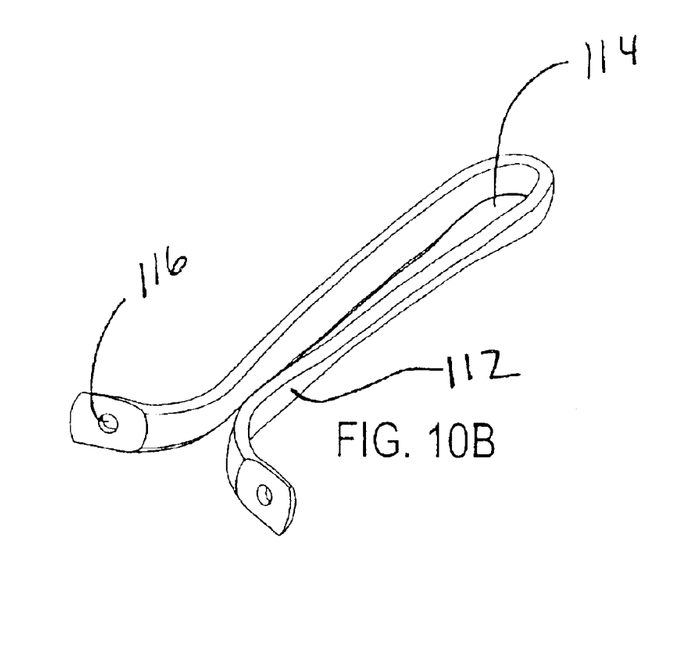
FIG. 10B is prospective view of the handle of FIG. 10A.

An embodiment of the handle 110 for the cookware item 100 is shown in FIGS. 10A and 10B. The handle 110 includes two legs or branches 112 on opposite sides of an opening 114. The handle 110 may be fastened to the cooking vessel 140 by passing fasteners through the holes 116. The provision of the opening 114 minimizes the heat transfer between the cooking vessel 140 and the handle 110 thereby facilitating gripping of the handle by the user.

The handle 110 provides a more comfortable gripping structure than conventional handle arrangements. The handle 110 is preferably formed from stainless steel or chrome plated stock wire material. The wire preferably has an oval cross-section. As shown in FIGS. 10A and 10B, the wire is bent around the opening 114 to form and handle and is also flattened in the gripping region to provide for a comfortable gripping surface to the user.

Figure 5:
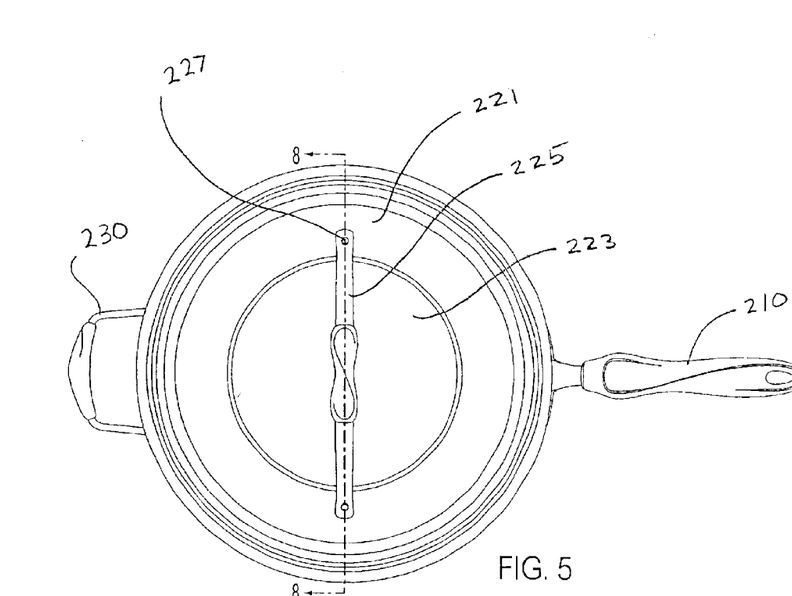
FIG. 5 is a top plan view of an item of cookware according to another embodiment of the present invention.
Figure 6:
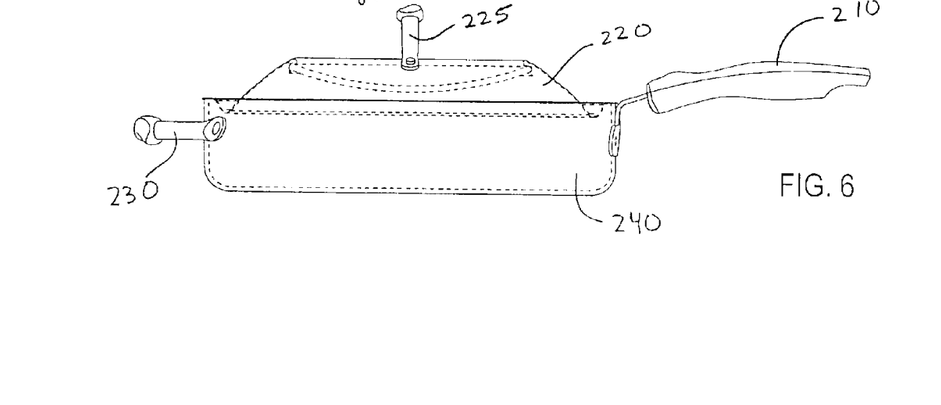
FIG. 6 is a side view in elevation of the cookware item of FIG. 5.

Another embodiment of the present invention is disclosed in FIG. 5. The cookware device 200 includes a cover 220, a long handle 220 and a short handle 230. As shown in FIG. 6, the cookware device 200 also includes a cooking vessel 240 for receiving items of foods to be cooked. The cookware cover 220 includes a downwardly curved centrally located portion 223. A cover handle 225 spans the recessed portion 223 and is connected to the surrounding portion 221 of the cover by a pair of fasteners 227. As shown in the embodiment of the invention depicted in FIG. 6, the recessed portion 223 is preferably concave and the surrounding portion 221 may be dome shaped (i.e. upwardly curved).

As mentioned above, according to one embodiment of the invention the portion of the cover surrounding the recessed portion 223 may be dome shaped. However, the scope of the present invention includes other configurations. For example, the portion of the cover surrounding the concave center may be flat, pyramidal, cone shaped, stepped, angled, etc. Also, the cover may have a perimeter shaped to match the cooking vessel being covered. For example, square, rectangular or oval shaped covers may be employed.

Figures 7A, 7B, 7C, 7D:
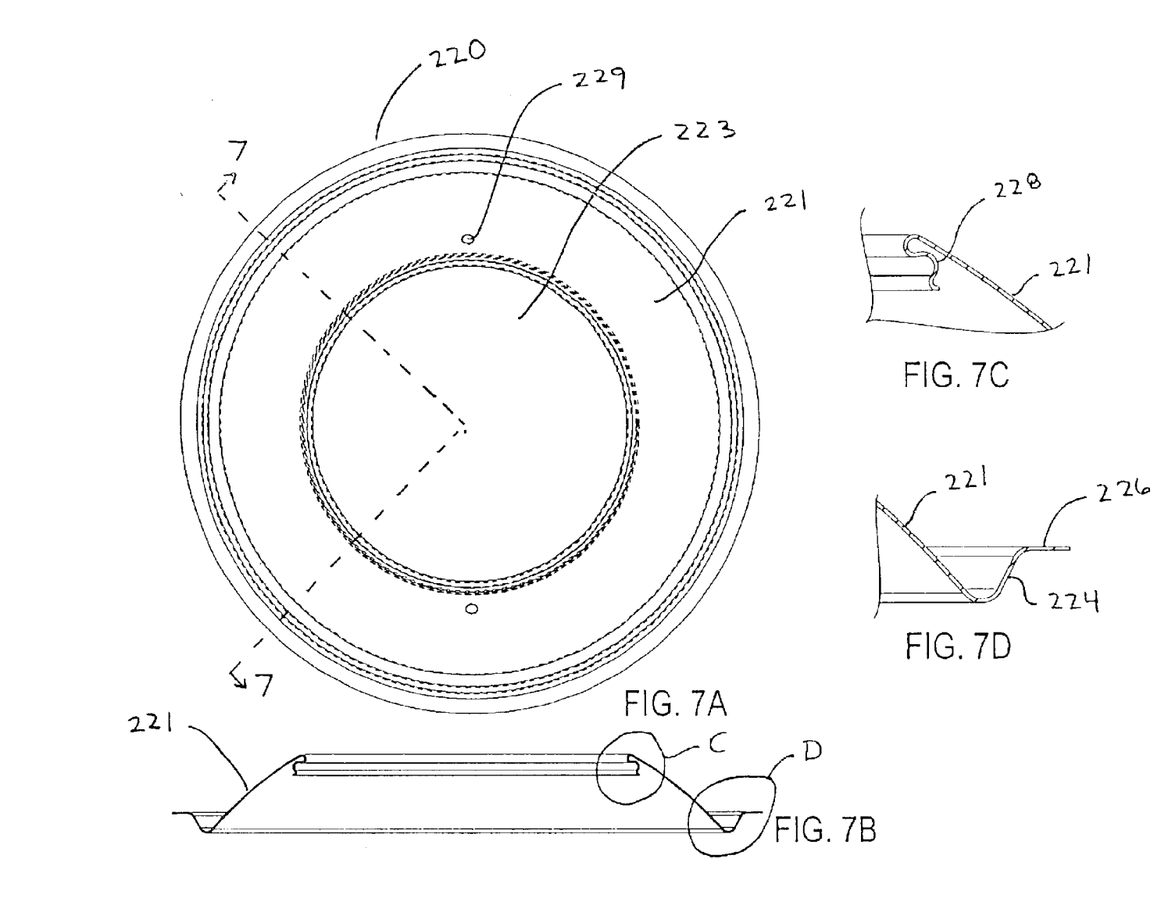
FIG. 7A is a top plan view of a cookware cover according to another embodiment of the present invention.
FIG. 7B is a cross-sectional view of the cookware cover of FIG. 7A taken along line 7—7.
FIG. 7C is an enlarged view of the portion of FIG. 7B surrounded by circle C.
FIG. 7D is an enlarged view of the portion of FIG. 7B surrounded by circle D.
Figure 8:
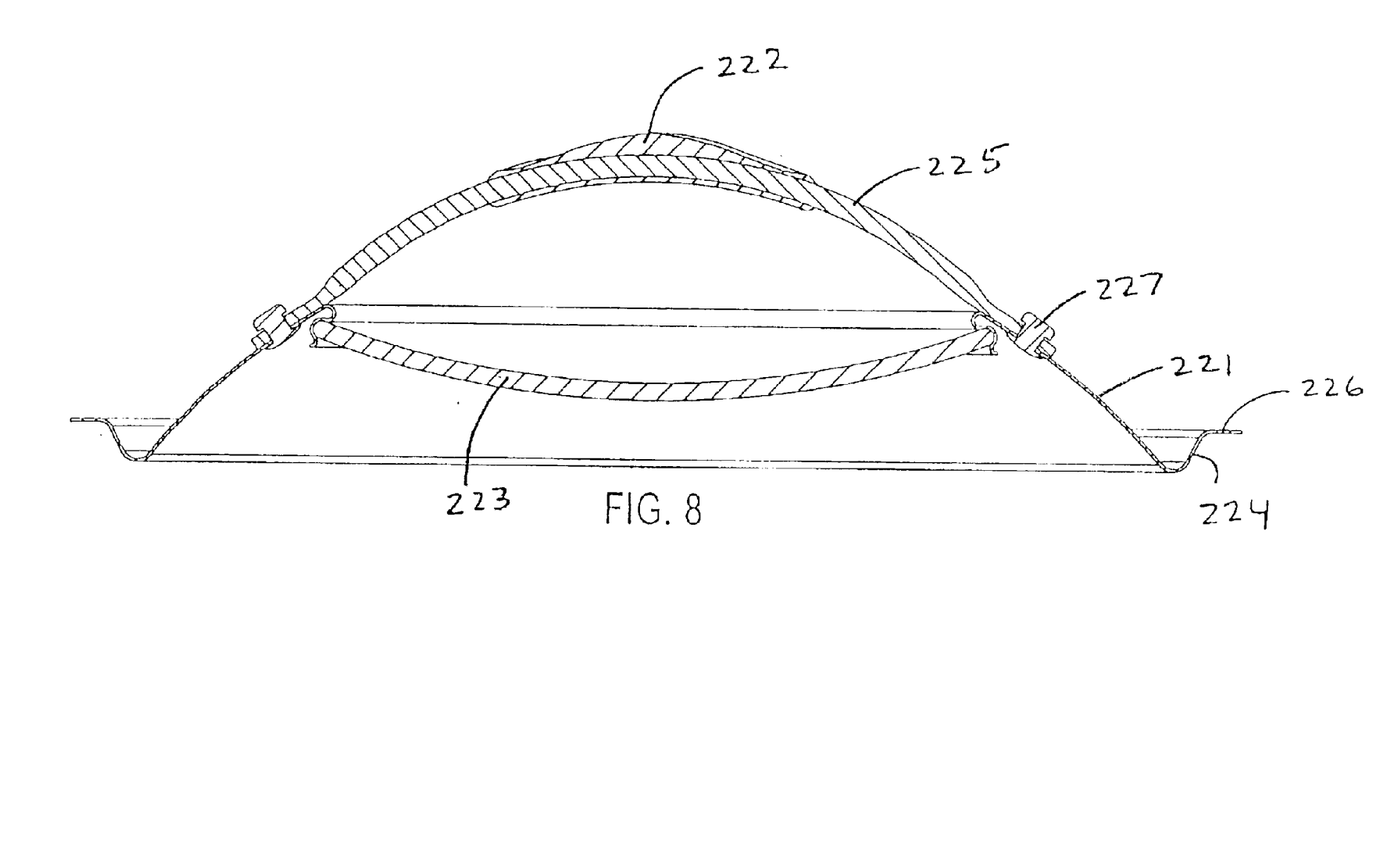
FIG. 8 is a cross-sectional view of the cookware cover of FIG. 5 taken through line 8—8.

As shown in FIG. 8, the portion of the cover 221 surrounding the center concave portion 223 rises upwardly from the cooking vessel 240. The concave portion 223 extends downwardly towards the cooking vessel 240. As shown in FIG. 7A, the surrounding portion may include a pair of holes 229 for receiving the fasteners to connect the cover handle 225 to the cover. As shown in FIG. 8, the center portion 223 may be formed separately from the rest of the cover. For example, the center portion 223 may be formed of transparent material, such as glass, to allow the user to see into the cooking vessel 240.

The cover 220 includes an outer rim. The outer rim has a lip 226 for resting on the top rim of the cooking vessel 240.

When the cover is positioned on the cooking vessel 240, the portion of the cover surrounding the center portion extends downwardly toward the rim below the top rim of the cooking vessel 240 and curves upward to the lip 226. The cover 220 includes a generally angled section 224 extending downward form the lip 226 toward the cover 221, as shown in FIG. 7D. The provision of the angled section 224 allows the user to more easily place the cover 220 on the cooking vessel 240. As shown in FIG. 8, the cover handle 225 may include a grip 222 to facilitate grasping of the handle.

As shown in FIG. 8, the concave portion of the cover may be separately formed from the surrounding portion of the cover formed. The concave portion 223 is preferably formed of glass or other transparent material capable of withstanding cooking temperatures. The surrounding portion of the cover 221 is preferably formed out of metallic materials such as stainless steel. At an upper edge, the cover 221 may include a retaining channel 228. The channel 228 is curved to receive the edge of the concave portion 223. During manufacture the concave portion 223 is preferably forced into the channel 228 and retained in place due to the elasticity of the dome shaped portion 221.

Figures 11A, 11B:
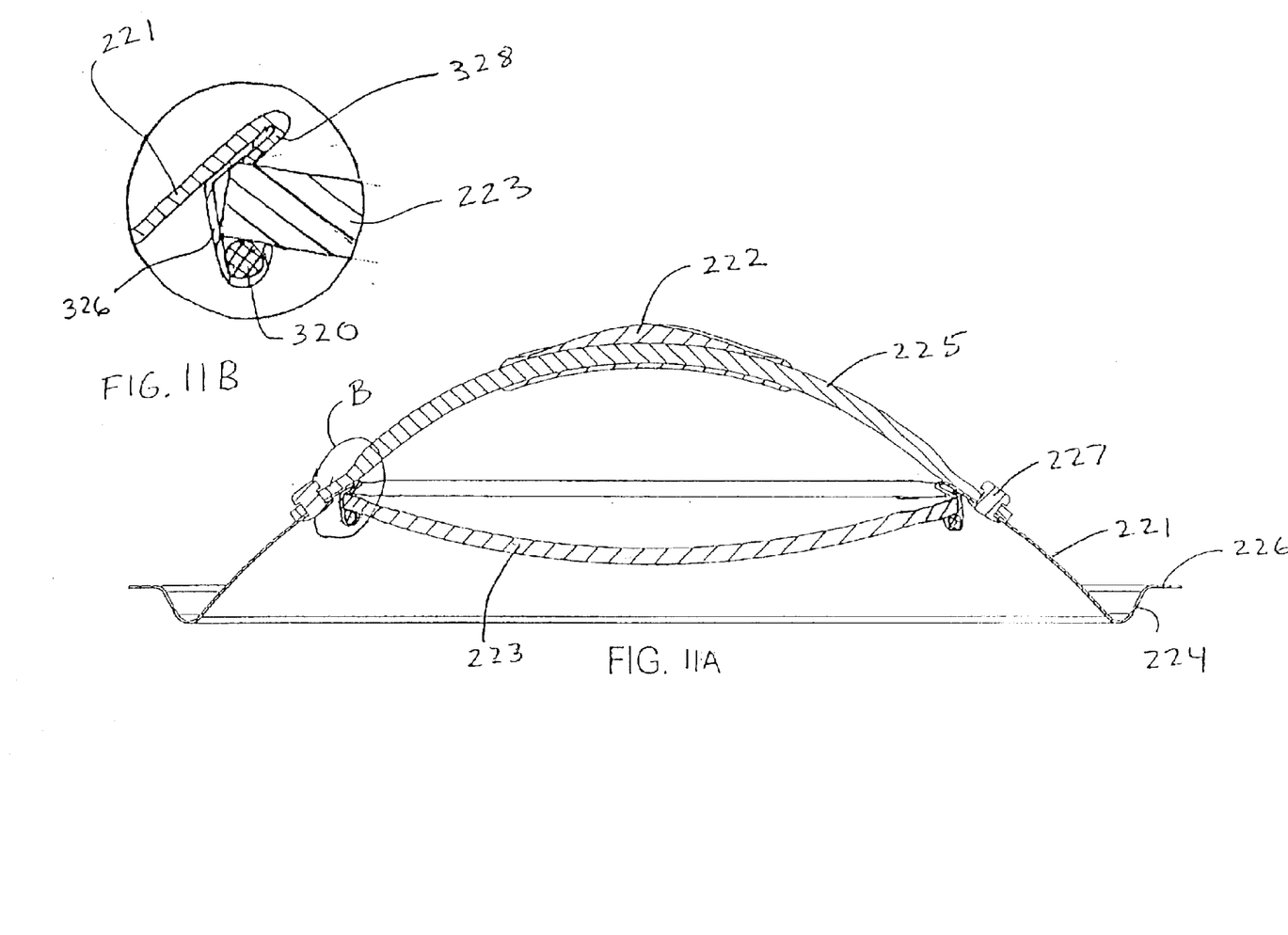
FIG. 11A is a cross-sectional view of an alternative embodiment of a cookware cover.
FIG. 11B is an enlarged view of the portion of FIG. 11A surrounded by circle B.

The scope of the present invention includes alternative embodiments for connecting concave center portion 223 and the surrounding portion of the cover 221. For example, as shown in FIGS. 11A and 11B, the cover may include a J-shaped clip 326 for retaining the transparent concave piece 223 in position. The clip 326 is fitted into a bend in the cover 221 and may include a resilient gasket 320, preferably silicon. The gasket 320 is preferably located in the bend of the clip 326 and provides a tight seal between the clip 326 and the concave portion 223.

As mentioned above, the concave portion 223 provides the same benefits to the user as the concave portion 123 mentioned above (e.g., basting and gripping without contacting the cover). In addition, when formed of a transparent material the concave portion 223 allows the user to see the food elements in the cooking vessel 240 without removing the cover and allowing heat to escape. The provision of the concave cover also facilitates maintaining a clear viewing surface, because the condensed moisture will fall from the surface due to the concave shape thereby reducing the vision obscuring effects of the condensation.

Figure 9A:
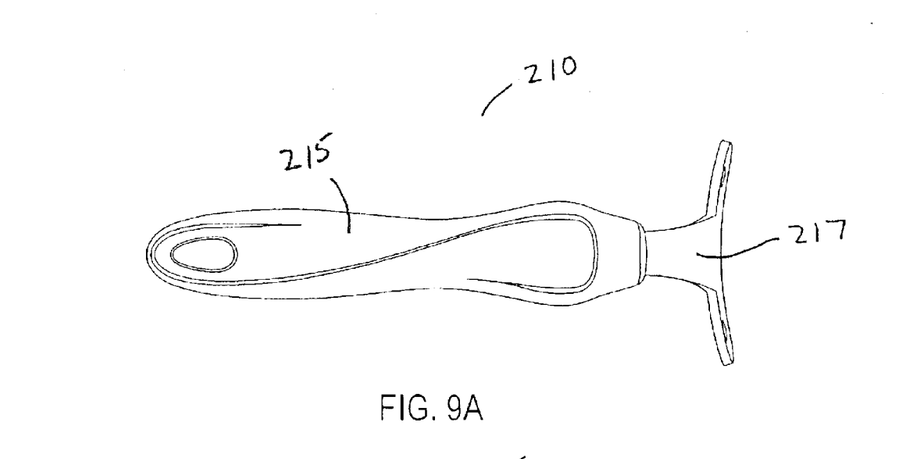
FIG. 9A is a top plan view of the long handle of the cookware item of FIG. 5.
Figure 9B:
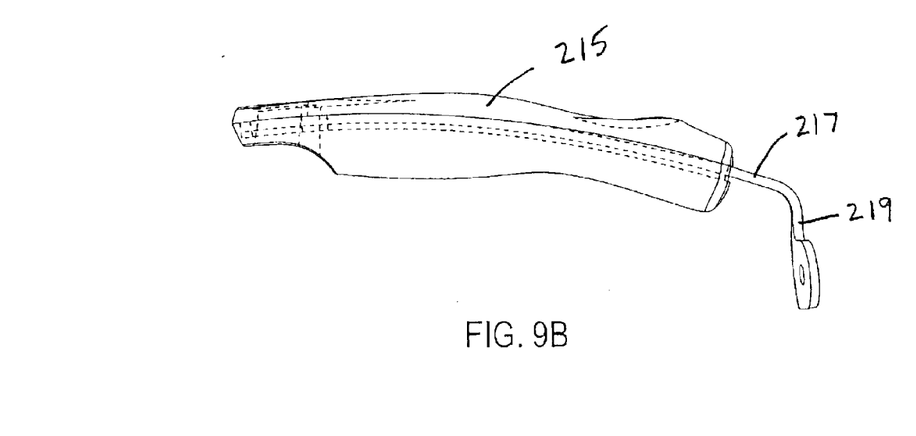
FIG. 9B is a side view of the handle of FIG. 9A.
Figure 9C:
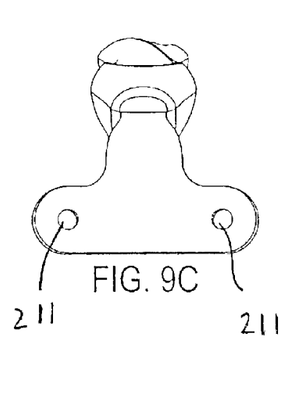
FIG. 9C is an end view of the handle of FIG. 9A.

The cooking device 200 also may include a long handle 210. The long handle includes an ergonomic grip 215 covering a rigid stem 217. The stem 217 includes a splayed section 219 adjacent to the cooking vessel 240. This splayed section 219 includes a pair of holes 211 for fastening the handle 210 to the cooking vessel 240. The ergonomic grip 215 also serves to minimize the heat transfer from the cooking vessel to the user's hand.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined a set forth in the following claims.

What is claimed is:

1. A cookware device comprising:
   a cooking vessel with a top rim;
   a cover for the cooking vessel;
   wherein the cover includes a transparent concave portion positioned centrally on the cover, the concave portion having exterior and interior surfaces curved downwardly toward the cooking vessel, and an outer rim with a lip configured to rest on the top rim of the cooking vessel so that when the cover is positioned on the cooking vessel, the portion of the cover surrounding the center portion extends downwardly toward the rim below the top rim of the cooking vessel and curves upward to the lip;
   wherein the portion of the cover surrounding the concave portion is metallic and concentrically aligned with the concave portion; and
   wherein the cover is configured so that when the cover is installed on a cooking apparatus condensed moisture will run along an interior surface of the cover to a base of the concave portion and drop from the base into the cooking vessel to thereby clear the transparent concave portion and provide improved viewing of food contained in the vessel.

2. The cover of claim 1, further comprising a handle connected to the exterior surface of the cover surrounding the concave portion and positioned to span the concave portion so that when the handle is gripped the likelihood of contact with the cover is reduced.

3. The cover of claim 1, wherein the portion of the cover surrounding the concave portion is dome shaped.

4. The cookware device of claim 1, the cover further includes angled section extending downward from the lip toward the cover.

5. The cookware device of claim 1, wherein the cover further includes a vertical section extending downward from the lip to provide a snug fit between the cover and vessel.

* * * * *